(12) United States Patent
Park

(10) Patent No.: US 9,267,673 B2
(45) Date of Patent: Feb. 23, 2016

(54) LED STREETLAMP DEVICE

(75) Inventor: Seung Wook Park, Ansan-si (KR)

(73) Assignee: LEOTECH, Ansan-Si (KR)

( * ) Notice: Subject to any disclaimer, the term of this patent is extended or adjusted under 35 U.S.C. 154(b) by 398 days.

(21) Appl. No.: 13/643,850

(22) PCT Filed: Aug. 31, 2010

(86) PCT No.: PCT/KR2010/005873
§ 371 (c)(1),
(2), (4) Date: Oct. 26, 2012

(87) PCT Pub. No.: WO2011/136441
PCT Pub. Date: Nov. 3, 2011

(65) Prior Publication Data
US 2013/0039040 A1 Feb. 14, 2013

(30) Foreign Application Priority Data

Apr. 29, 2010 (KR) .................. 10-2010-0004512
Apr. 29, 2010 (KR) .................. 10-2010-0039983
May 13, 2010 (KR) .................. 10-2010-0044787

(51) Int. Cl.
| | |
|---|---|
| *F21V 5/04* | (2006.01) |
| *F21V 29/00* | (2015.01) |
| *F21V 5/00* | (2015.01) |
| *F21S 8/08* | (2006.01) |
| *F21W 111/02* | (2006.01) |

(Continued)

(52) U.S. Cl.
CPC ............... *F21V 29/004* (2013.01); *F21S 8/086* (2013.01); *F21V 5/00* (2013.01); *F21V 5/004* (2013.01); *F21V 5/007* (2013.01); *F21W 2111/02* (2013.01); *F21Y 2101/02* (2013.01); *F21Y 2111/002* (2013.01); *Y02B 20/72* (2013.01)

(58) Field of Classification Search
CPC .......... F21K 9/135; F21V 5/04; F21V 5/004; F21V 5/007; F21V 5/046
USPC ....................................... 362/335
See application file for complete search history.

(56) References Cited

U.S. PATENT DOCUMENTS

| | | |
|---|---|---|
| 2005/0174780 A1 | 8/2005 | Park |
| 2009/0154158 A1* | 6/2009 | Cheng et al. ............. 362/237 |
| 2010/0053963 A1 | 3/2010 | Yang |

FOREIGN PATENT DOCUMENTS

| | | |
|---|---|---|
| JP | 2007165051 | 6/2007 |
| JP | 2007-311178 | 11/2007 |

(Continued)

OTHER PUBLICATIONS

Notice of Allowance, JP Application No. 2013-507858, Feb. 3, 2015.

*Primary Examiner* — Karabi Guharay
(74) *Attorney, Agent, or Firm* — Lex IP Meister, PLLC

(57) ABSTRACT

Provided is a light emitting diode (LED) streetlamp device. The LED streetlamp device includes a body frame comprising a first flat part and a first inclined part formed being extended from a rim portion of the first flat part with a certain incline angle θ1, a light emitting part installed on the first flat part and the first inclined part, comprising a plurality of LED lamps, and a transmission plate comprising a second flat part located being separated from the first flat part with a certain distance and a second inclined part extended from a rim portion of the second flat part with a certain incline angle θ2 separated from the first inclined part with a certain distance and covering the body frame.

6 Claims, 16 Drawing Sheets

(51) Int. Cl.
  *F21Y 101/02* (2006.01)
  *F21Y 111/00* (2006.01)

(56) References Cited

FOREIGN PATENT DOCUMENTS

| | | |
|---|---|---|
| JP | 2008-010435 | 1/2008 |
| JP | 3146628 | 10/2008 |
| JP | 2009-266513 | 11/2009 |
| JP | 2010-118223 | 5/2010 |
| KR | 20-0350484 | 5/2004 |
| KR | 10-0811061 | 3/2008 |
| KR | 20-2008-0004939 | 10/2008 |
| KR | 20-0444244 | 4/2009 |
| KR | 1020100009257 | 1/2010 |
| WO | 2009/054649 | 4/2009 |

\* cited by examiner

LED STREETLAMP DEVICE

TECHNICAL FIELD

The present invention relates to a light emitting diode (LED) streetlamp device, and more particularly, to an LED streetlamp device where a plurality of LED light sources are installed in ways that are both horizontal and inclined, thereby providing both uniform direct illumination and peripheral illumination. Also, the present invention relates to an LED streetlamp device capable of easily discharging heat from an LED lamp. Also, the present invention relates to an LED streetlamp device capable of being easily installed and disassembled.

Also, the present invention relates to a body frame of an LED streetlamp device where a plurality of LED light sources are installed on both a horizontal part and an inclined part of an outer surface thereof, thereby providing both uniform direct illumination and peripheral illumination. Also, the present invention relates to a transmission plate of the LED streetlamp device to allow light from the light sources to be homogenized while discharged.

BACKGROUND ART

Generally, streetlamp devices are lighting fixtures installed along the street to provide safety and security in road traffic. Such streetlamp devices are installed on main roads, roads in business zones and residential zones in suitable forms depending on places thereof. According to the present installation standards of streetlamp devices, when installing streetlamp devices 10 meters above the ground, side illumination occurring in locations 12 meters from right and left sides of a place on the ground, where the streetlamp device is installed, should be 20 lux.

Conventional streetlamp devices employ lamps emitting light using the resistance of filaments, which have short lifespans and consume a lot of power. Recently, there have been developed and applied light emitting diode streetlamp devices employing LED lamps as light sources, the LED lamps having lifespans longer than those of the lamps employing filaments, the efficiency of the LED lamps being high.

On the other hand, as shown in FIG. 1, a general LED streetlamp device 100 includes a body frame 130 with LED lamps 110 attached as light sources and a reflective plate 120 reflecting light from the LED lamps 110 toward an area directly below or a peripheral area; and a transmission plate 140 manufactured using transparent glass or transparent plastic covering the LED lamps 110 and the reflective plate 120 attached to the body frame 130. Also, on top of the body frame 130, there is provided a fastening portion 150 formed in the shape of a bar or a pipe. Accordingly, the LED streetlamp device 100 may be attached and installed to a connecting bar 210 of a lamppost 200 by coupling the fastening portion 150 therewith using a general coupling member 220 formed of one of a bolt, a nut, and a bracket.

Also, the connecting bar 210 of the lamppost 200, coupled with the fastening portion 150, is formed in the shape of a bar with a certain diameter. However, in some cases, as an example, when providing a shielding member 230 for protecting the streetlamp device 100 together with the connecting bar 210 formed in a single body, as shown in FIG. 2, the connecting bar 210 may have an extended diameter of an end thereof. In this case, the fastening portion 150 of the LED streetlamp device 100 is also designed according to the extended diameter of the connecting bar 210.

Referring to FIG. 2, a reference numeral 210a indicates an extended diameter portion of the connecting bar 210 and a reference numeral 150a indicates an extended diameter portion of the fastening portion 150. Also, in FIG. 2, for example, the extended diameter portion 150a of the fastening portion 150 is coupled with the extended diameter portion 210a of the connecting bar 210 by a screw-connection.

However, considering that streetlamp devices are generally deployed with intervals about 30 to 50 meters apart along the street, the LED streetlamp devices 100 should emit light to the front and rear of the street to provide 20 lux of illumination on a spot on the ground 12 meters from the front and rear of a location on the street, which is the standard for installing streetlamp devices.

However, since the LED streetlamp device 100 only has one of a flat configuration and a configuration inclined toward a certain direction and emits light only toward the area directly below and a certain position of the peripheral area, it is not possible to uniformly emit light toward the area directly below and the peripheral area.

Also, since the LED streetlamp device 100 emits heat of a high temperature due to characteristics thereof, there may occur damage to diodes due to the heat. However, there is no effective countermeasure against the heat emission of the body frame 130.

Also, there is a problem in that it is not easy to install the lamp on the lamppost. That is, it is necessary to prepare streetlamp devices having diameter portions suitable for the diameter of the connecting bar.

Also, in case of the streetlamp device 100, since the light from the light sources 110 passes through the transmission plate 140, the strength thereof is decreased due to reflection or scattering.

DISCLOSURE

Technical Problem

Therefore, considering the above problems, the present invention provides a streetlamp device 1) capable of uniformly emitting light from light emitting diode (LED) lamps toward not only an area directly below but also a peripheral area with the same illumination by installing the LED lamps on both a horizontal plane and an inclined plane, 2) capable of uniformly emitting light from the LED lamps, 3) capable of having a heat radiating configuration to easily discharge heat emitted from the LED lamps, thereby preventing the device from being damaged, 4) capable of being easily installed on a lamppost by employing a simple connecting configuration, 5) capable of improving the durability of the LED streetlamp device by providing a rainwater drain, and 6) capable of emitting light to be homogenized via a plurality of lenses on a surface of a transmission plate.

The technical objects of the present invention are not limited to those described above, and it will be apparent to those of ordinary skill in the art from the following description that the present invention includes other technical objects not specifically mentioned herein.

Technical Solution

According to an aspect of the present invention, there is provided a light emitting diode (LED) streetlamp device. The LED streetlamp device includes: a body frame comprising a first flat part and a first inclined part formed being extended from a rim portion of the first flat part with a certain incline angle θ1; a light emitting part installed on the first flat part and the first inclined part, comprising a plurality of LED lamps; and a transmission plate comprising a second flat part located being separated from the first flat part with a certain distance and a second inclined part extended from a rim portion of the second flat part with a certain incline angle θ2 separated from the first inclined part with a certain distance and covering the body frame.

Advantageous Effects

According to the present invention, there is provided an effect of uniformly increasing both direct and indirect illumination of the LED lamps. Also, there is provided an effect of easily discharging heat from the LED lamps. Also, there is provided an effect of easily installing a lamppost. Also, it is possible to improve the durability of the LED streetlamp device by employing a rainwater-drain configuration. Also, there is provided an effect of improving illumination of the periphery of the LED streetlamp device by emitting light from light sources via the transmission plate including lenses toward an area directly below and a peripheral area.

DESCRIPTION OF DRAWINGS

The above and other features and advantages of the present invention will become more apparent by describing in detail exemplary embodiments thereof with reference to the attached drawings in which.

BEST MODE FOR CARRYING OUT THE INVENTION

Hereinafter, preferred embodiments will be described in more detail with reference to the accompanying drawings. Moreover, detailed descriptions of well-known functions or configurations will be omitted in order not to unnecessarily obscure the focus of the present invention.

[Configuration of Body Frame]

Figure 1:
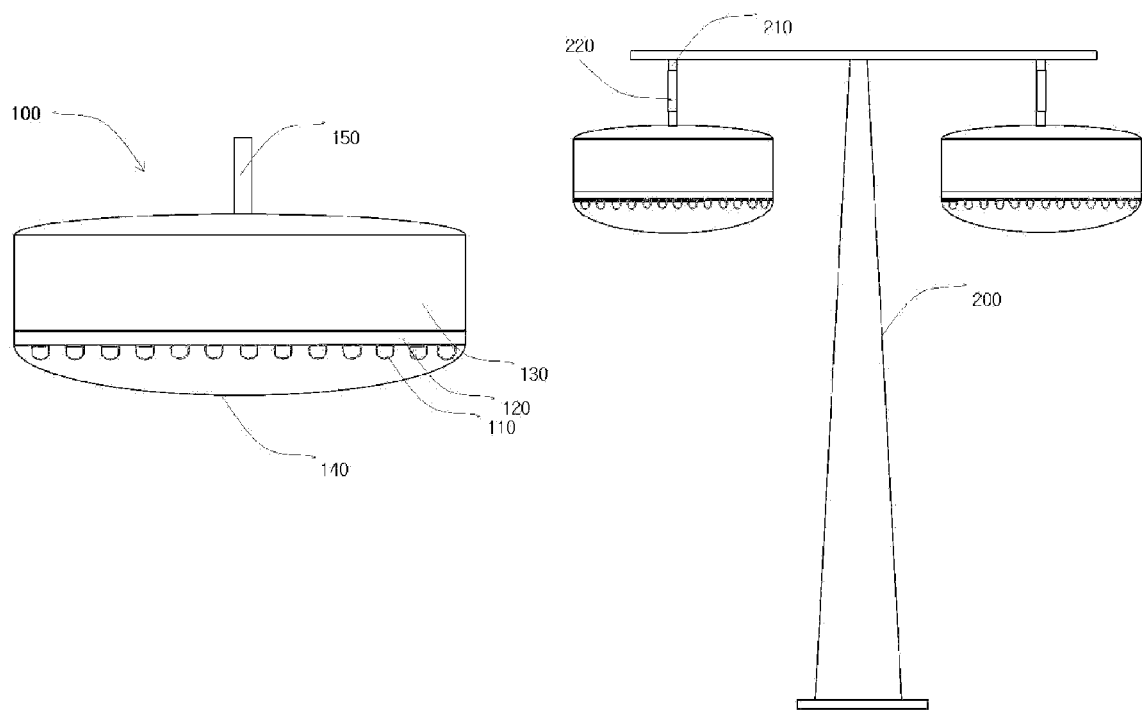
FIGS. 1 and 2 are schematic diagrams illustrating a general light emitting diode (LED) device installed on a lamppost.
Figure 2:
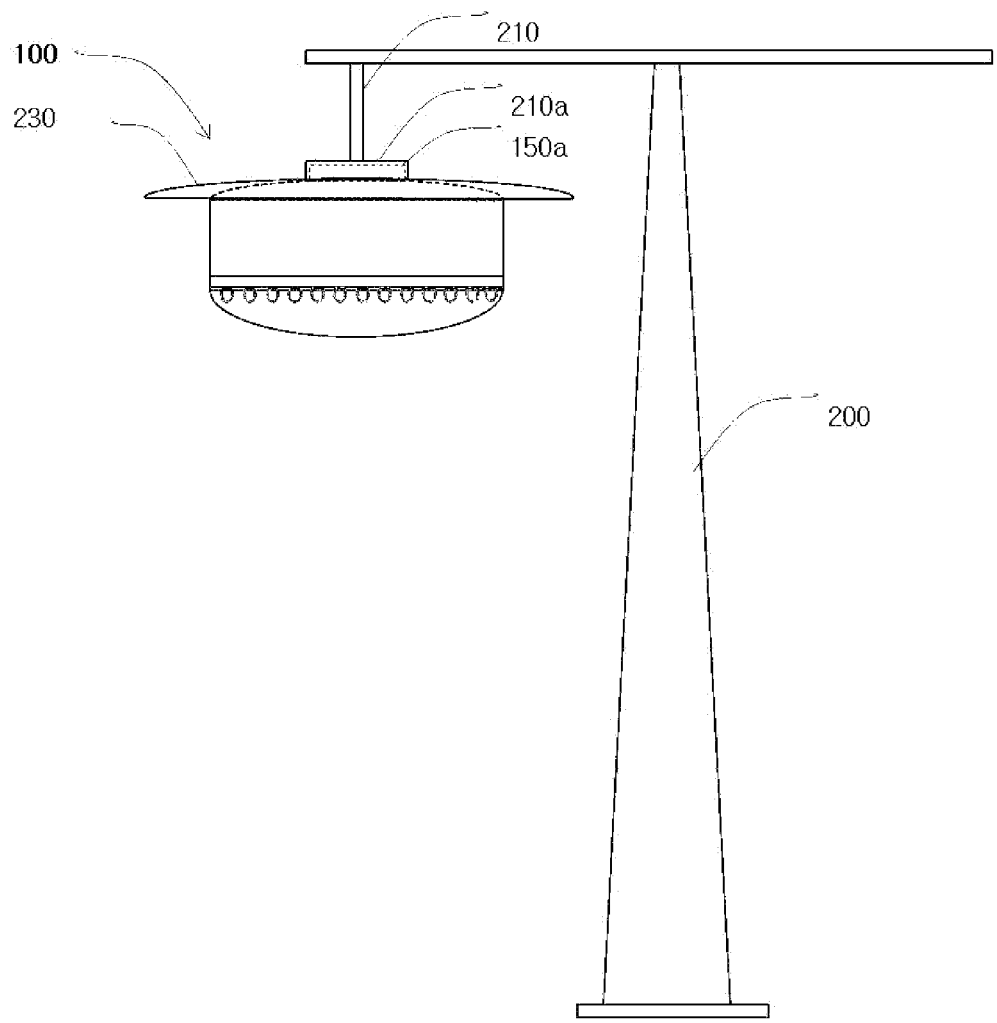
Figure 3:
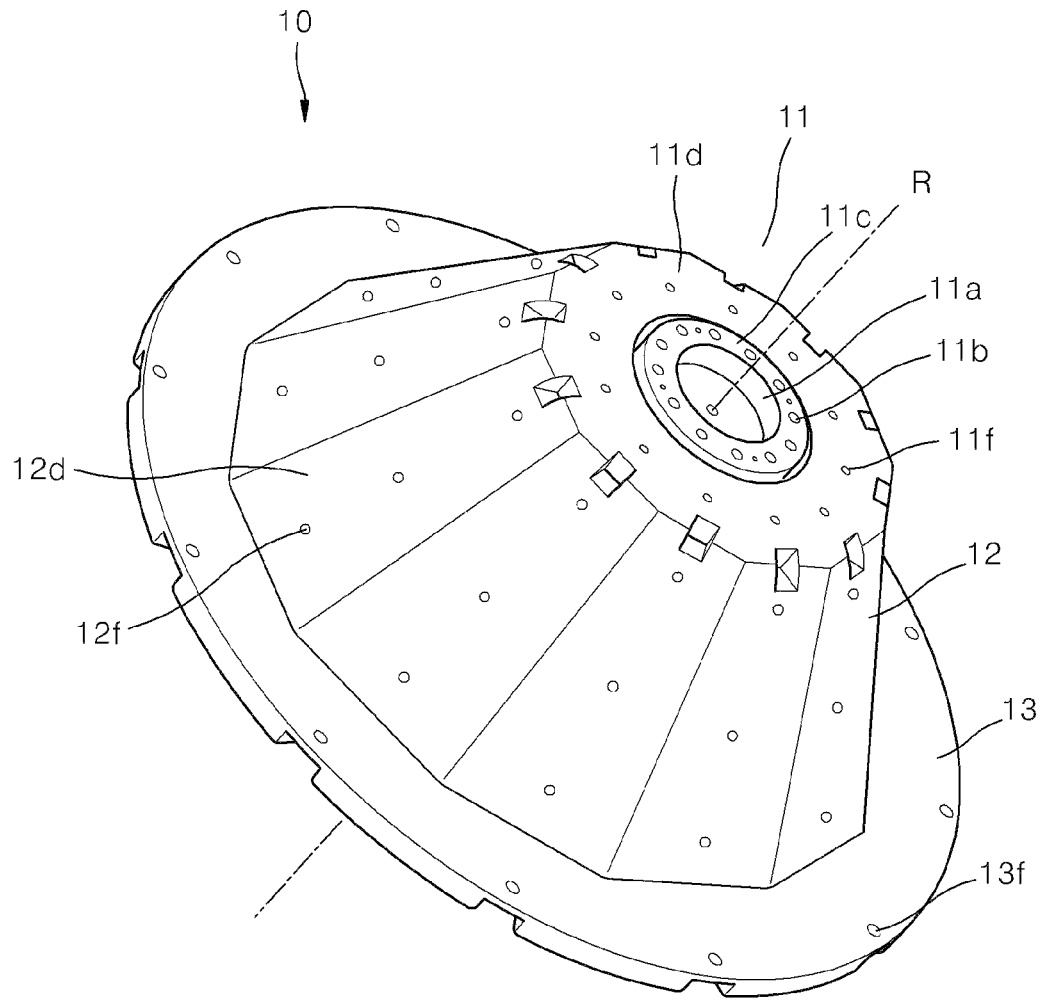
FIG. 3 is a top perspective view illustrating a body frame according to an embodiment of the present invention.
Figure 4:
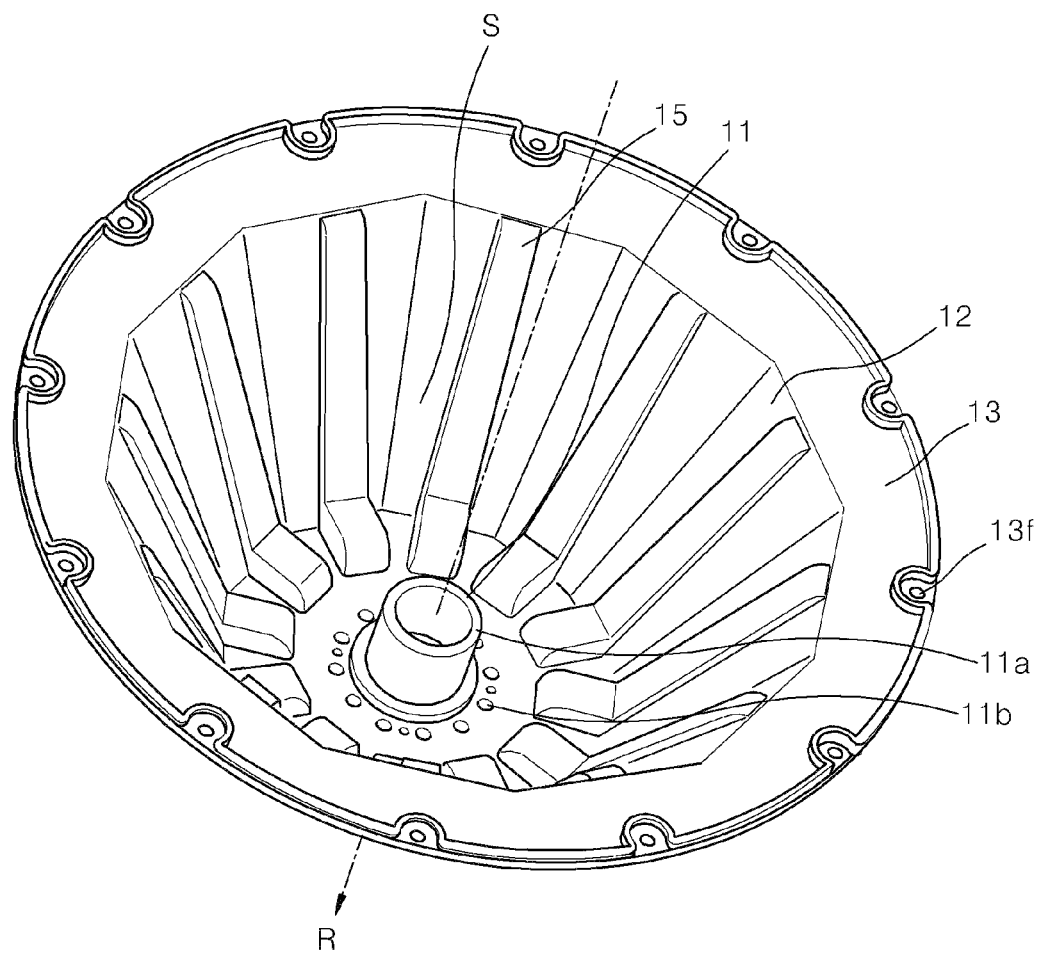
FIG. 4 is a bottom perspective view illustrating the body frame of FIG. 3.

FIG. 3 is a top perspective view illustrating a body frame 10 that is an element of a light emitting diode (LED) streetlamp device according to an embodiment of the present invention, and FIG. 4 is a bottom view illustrating the body frame.

As shown in the drawings, the body frame 10 includes a flat part 11 formed of a flat plane, an inclined part 12 extended from the flat part 11 with a certain incline angle θ1, and a rim part 13 for coupling, formed on an end of the inclined part 12. Referring to FIGS. 3 and 4, the flat part 11 and the rim part 13 are formed to be horizontal planes parallel to each other and the inclined part 12 is located therebetween with a certain incline in such a way that the body frame 10 is formed in the shape of a brimmed hat.

In this case, as shown in FIG. 4, a fastening portion 11a for coupling with a connecting bar 210 of a lamppost for the LED streetlamp device is formed in the center of an inner surface of the flat part 11 and a plurality of drain holes 11b connecting the inner surface and an outer surface are provided around the fastening portion 11a. In detail, the fastening portion 11a is formed in the shape of a cylinder vertically extended from the center portion of the flat part 11 and the plurality of drain holes 11b are formed circularly around a center line R on the periphery of the fastening portion 11a on the surface of the flat part 11.

On the other hand, there is provided a screw thread on one of an inside and an outside of an end portion of the fastening portion 11a to be attached to the lamppost by using a connecting member described later. Also, as shown in FIG. 3, on the outer surface, a periphery portion 11c of the fastening portion 11a where the drain holes are formed is formed in a ring shape on the flat part 11, projected with a difference in level from the fastening portion 11a, which functions as a coupling part to fasten a transmission plate 30 described later.

In addition, the flat part 11 is formed in a flat plane with 12 planes. That is, the flat part 11 has 12 edges. Accordingly, the inclined part 12 extended from the flat part 11 with the certain incline angle θ1 also has 12 planes. On the other hand, an outside portion of the periphery portion 11c where the drain holes 11b are formed on the flat part 11 becomes a first fastening surface 11d formed in a ring shape to fasten an LED lamp that is a light emitting part. On the other hand, in case of the body frame 10, since the flat part 11 faces the ground, and preferably, is located parallel to the ground, the LED lamp attached to the first fastening surface 11d of the flat part 11 emits light directly below.

Furthermore, the inclined part 12 is extended upward with the certain incline angle θ1 from the rim formed of 12 planes of the flat part 11, and accordingly, the surface thereof is formed of 12 planes. In other words, the inclined part 12 is extended from the end portion of the flat part 11 toward the rim part 13, thereby extending an internal diameter thereof and forming each plane to be a trapezoidal shape from the side. The trapezoidal planes become second fastening surfaces 12d. On the other hand, the inclined part 12 of the body frame is located inclined to the ground, and accordingly, the LED lamps to be attached to the inclined part 12 emit light toward the peripheral area around the area directly below.

In addition, the rim part 13 is formed on the same horizontal plane as that of the flat part 11 and a plurality of coupling holes 13f are formed on a surface thereof, thereby fastening the transmission plate 30 to the body frame 10.

On the other hand, according to forming the flat part 11, the inclined part 12, and the rim part 13 as described above, as definitely shown in FIG. 4, there is formed a space S on the body frame 10, surrounded with inner surfaces of the flat part 11 and the rim part 13. Such space S is designed to increase a contact between an inner surface of the body frame 11 and the outdoor air to easily discharge heat while the LED lamps are emitting heat.

Additionally, on the inner surfaces of the flat part 11 and the inclined part 12, surfaces of respective planes are projected to form, as an example, a plurality of heat-radiating walls 15. Such heat-radiating structures are to increase a surficial area of the body frame 10 to expand a contact area with the outdoor air, thereby maximizing a heat-radiating effect.

On the other hand, not definitely shown in FIG. 3, the outer surface of the inclined part 12 where the heat-radiating structures are formed may be formed in the shape of dents where the LED lamps may be attached.

Though the heat-radiating walls 15 are extended in a linear fashion along a longitudinal direction of the inclined part 12 in the drawing, the heat-radiating walls 15 are not limited thereto and may be extended in diverse ways, for example, orthogonally to the longitudinal direction. Accordingly, a plurality of heat-radiating walls extended parallel to the flat part 11 may be formed on the inner surface of the inclined part 12.

On the other hand, in FIGS. 3 and 4, there are formed 12 planes corresponding to the rim portion of the flat part 11 and the inclined part 12. However, the number of the planes is not limited thereto but may be, for example, 3, 4, 6, 8, 10. Also, the planes may be formed in curved shapes. Accordingly, it is obvious that the shape of the rim portion of the flat part 11 may be changed.

Meanwhile, the reason of forming the inclined part 12 to have 12 planes as an exemplary embodiment is to selectively attach light sources that are the LED lamps on the many-sided inclined part 12. In other words, since it is necessary to select levels of illumination and lighting directions depending on diverse installation places, the LED lamps should be selectively attached to the many-sided inclined part 12.

In this case, the body frame 10 may be formed to be symmetrical to the axis of rotation based on the center line R that is a reference line.

Referring to FIG. 3, reference numerals 11f and 12f indicate fastening means for fastening the LED lamps attached to the body frame 10, for example, holes for inserting screws.

Figure 5:
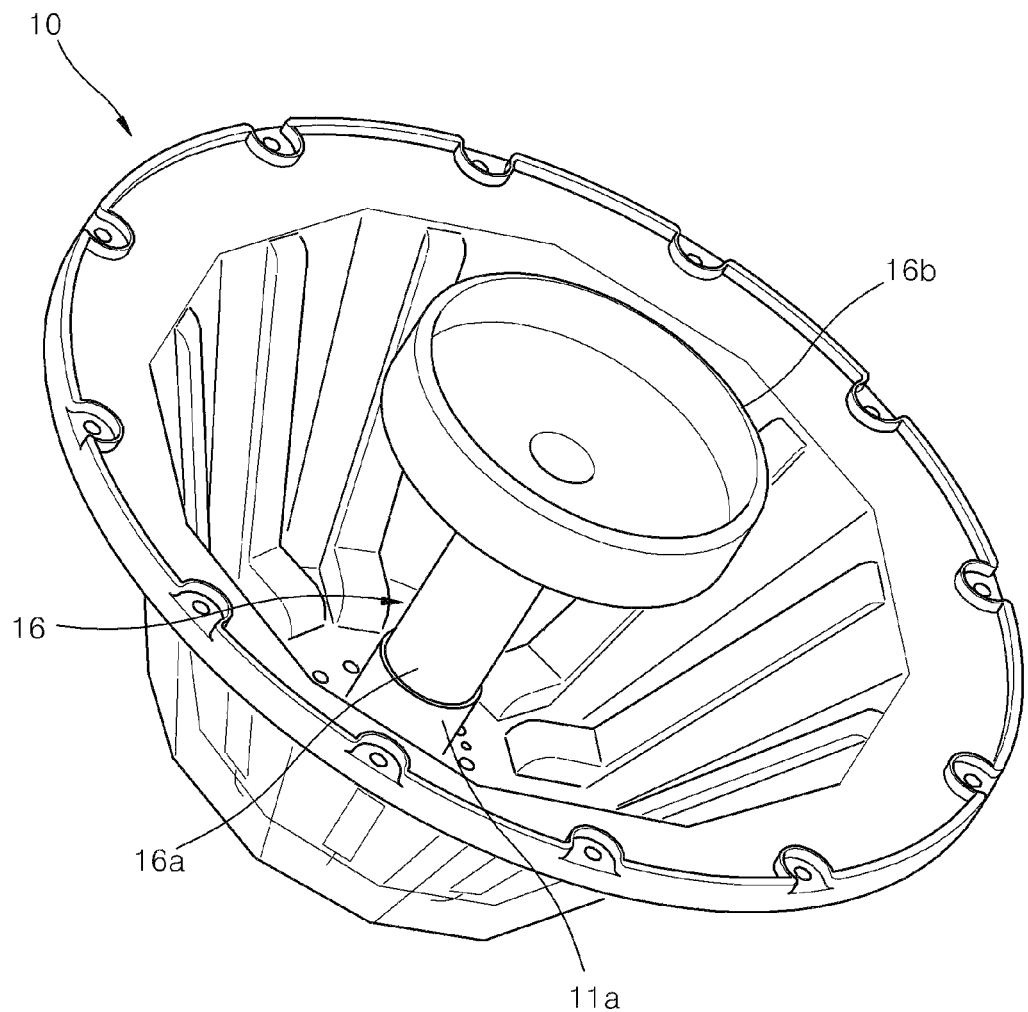
FIG. 5 is a view illustrating a connecting member attached to a fastening portion of the body frame to connect the body frame to a lamppost.
Figure 6:
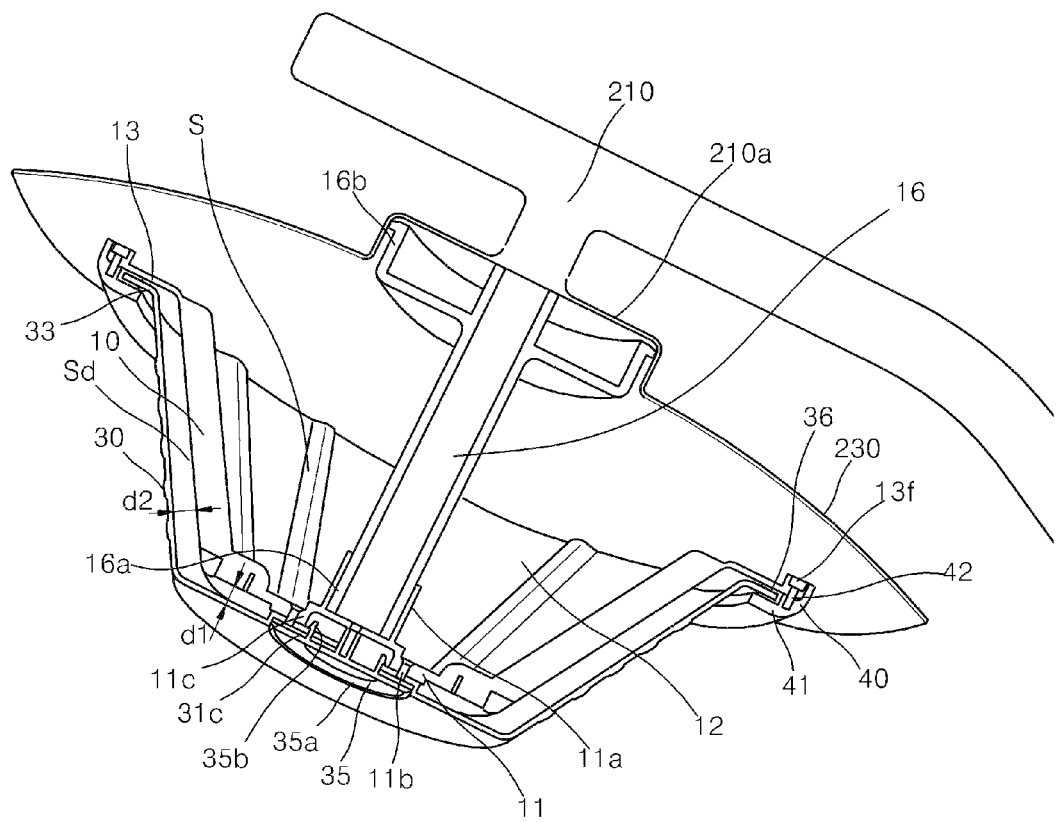
FIG. 6 is a view illustrating an exemplary streetlamp device including the body frame attached to the lamppost.

FIG. 5 illustrates a state in which a connecting element 16 for a connection to a lamppost is attached to the fastening portion 11a of the body frame 10, and FIG. 6 illustrates a state in which an example of a streetlamp device including the body frame 10 is attached to the lamppost.

As shown in FIG. 5, the connecting element 16 includes a first diameter portion 16a whose diameter is formed as the same as that of the cylindrical fastening portion 11a because the first diameter portion 16a is attached to the end portion of the cylindrical fastening portion 11a, and a second diameter portion 16b attached to the lamppost, the diameter of the second diameter portion 16b being extended wider than that of the first diameter portion 16a.

Referring to FIG. 6, in case of a general lamppost, an extended diameter portion 210a with a diameter corresponding to the second diameter portion 16b of the connecting element 16 is formed on a connecting bar 210, and simultaneously, there is provided a shielding element 230 that is a covering element is formed in a single body with the extended diameter portion 210a. However, the extended diameter portion 210a may be omitted on the connecting bar 210 and the shielding element 230 may be provided as an individual element independent from the extended diameter portion 210a.

Accordingly, the LED streetlamp device according to an embodiment of the present invention may include the body frame 10, a light emitting part 20, the transmission plate 30, and the shielding element 30. Meanwhile, since a coupling between such LED streetlamp device and the connecting bar 200 may be performed in many ways, the description thereof will be omitted.

With respect to the lamppost shown in FIG. 6, to attach the body frame 6 of the LED streetlamp device, the first diameter portion 16a of the connecting bar 16 is inserted into the fastening portion 11a and the second diameter portion 16b is inserted into the extended diameter portion 210a. Accordingly, while the space S is being shielded by the shielding element 230, the body frame 10 is attached to the lamppost. The shielding element 230 may be omitted. In case of the body frame 10, since the drain holes 11b are formed in the space S, though the shielding element 230 is omitted, moisture accumulated in a hollow portion may be discharged via the drain holes 11b, thereby preventing the deterioration of the streetlamp device due to the moisture accumulated in the space S.

In FIG. 6, the transmission plate 30 is located on the body frame 10 by coupling a rim part thereof with the rim part 13 of the body frame 10 as fastening means.

[Configuration of the Transmission Plate 30]

Figure 7:
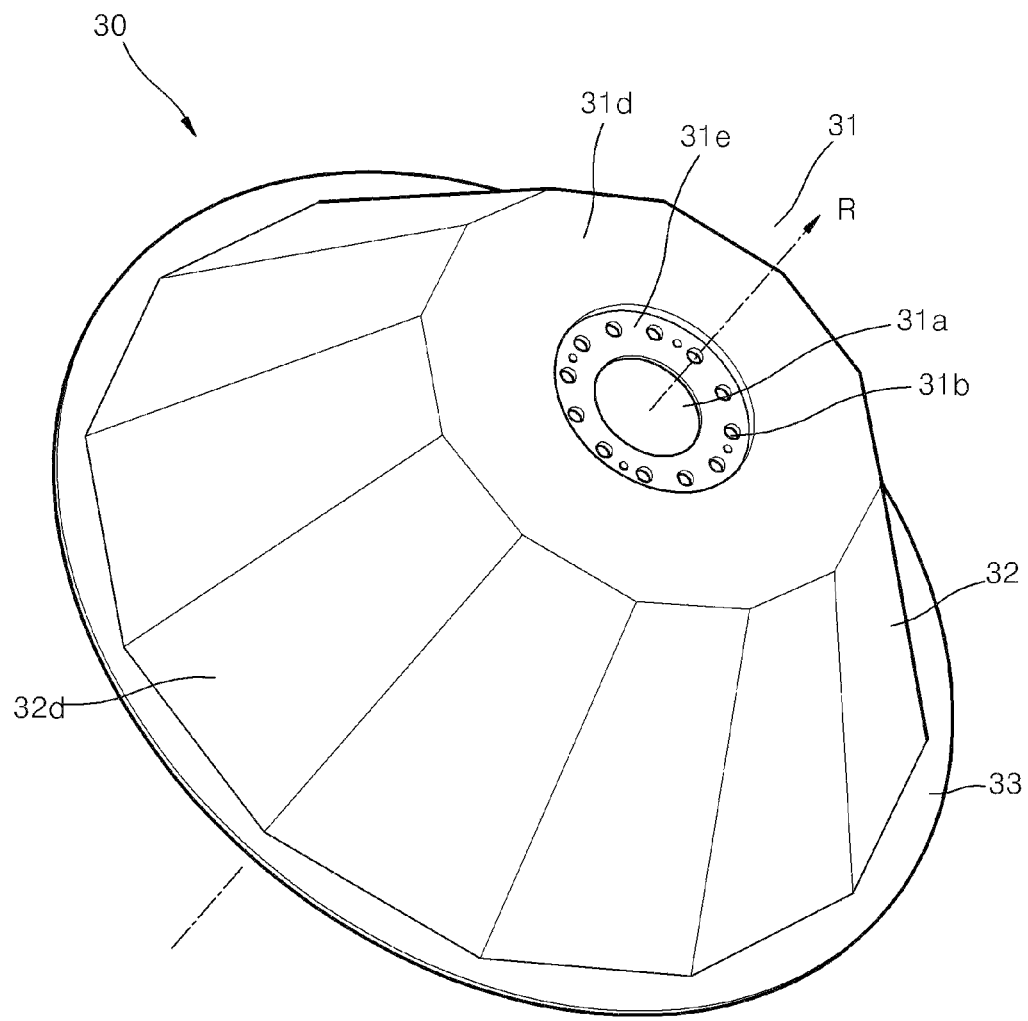
FIG. 7 is a top perspective view illustrating a transmission plate according to an embodiment of the present invention.
Figure 8:
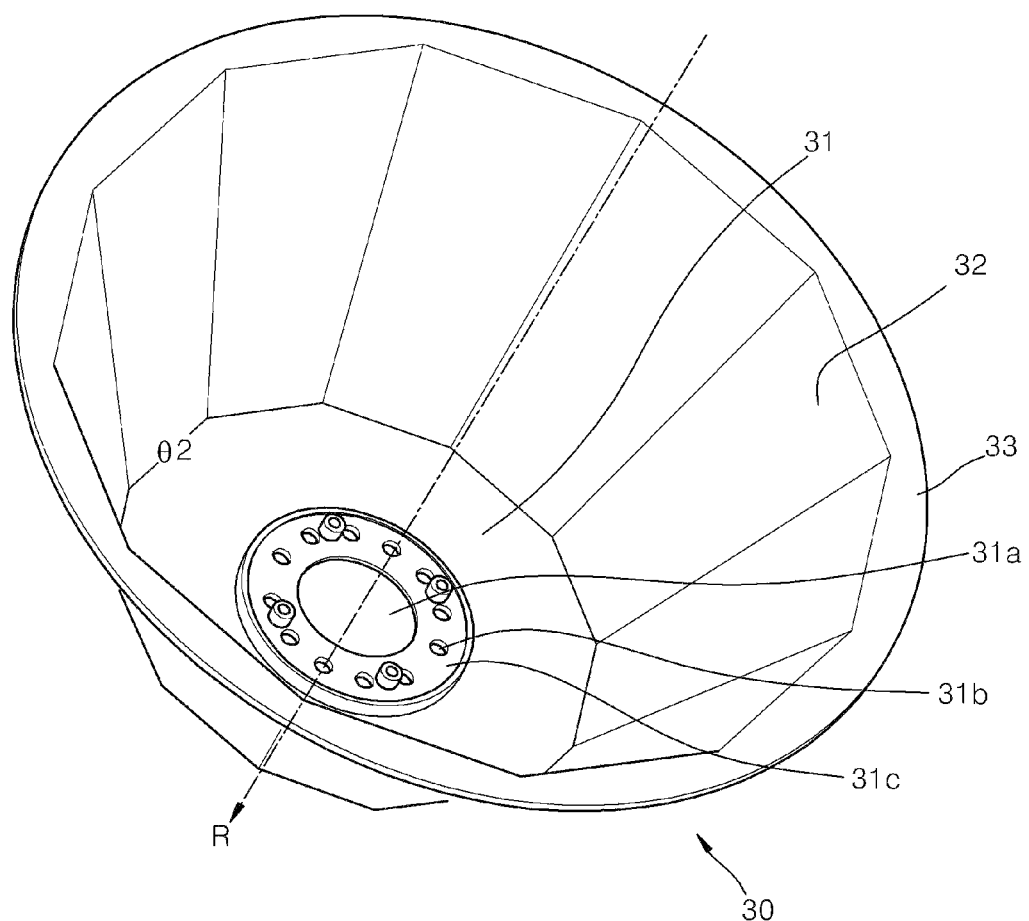
FIG. 8 is a bottom perspective view illustrating the transmission plate of FIG. 7.

FIG. 7 is a top perspective view illustrating the transmission plate 30 according to an embodiment of the present invention, and FIG. 8 is a bottom perspective view illustrating the transmission plate 30. The transmission plate 30 is to be inserted into the body frame 10, an external shape of the transmission plate 30 being in the same shape as that of the body frame 10.

As shown in the drawing, the transmission plate 30 includes a flat part 31, an inclined part 32 extended from the flat part 31 with a certain incline angle θ2, and a rim part 33 that is a coupling part formed on an end portion of the inclined part 32. Additionally, the flat part 31 and the rim part 33 are formed to be parallel to each other and the inclined part 32 is located therebetween with a certain incline in such a way that the transmission plate 30 is formed in the shape of a brimmed hat.

The center of the transmission plate 30 is open circularly to form a central opening portion 31a, and a coupling-fastening portion 31c formed in a ring shape corresponding to that of the periphery portion 11c is provided around the central opening portion 31a (refer to FIG. 8). On the coupling-fastening portion 31c, there are formed connecting holes 31b in locations corresponding to those of the drain holes 11b of the body frame 10. Accordingly, moisture such as raindrops drained via the drain holes 11b is discharged outside via the connecting holes 31b. In addition, an outer surface of the coupling-fastening portion 31c is formed to be dented with a certain depth to form a circular dented portion 31e (refer to FIG. 7), and a circular shielding plate 35 is inserted into the circular dented portion 31e. Accordingly, the drain holes 11b and the connecting holes 31b are invisible from the outside.

On the other hand, to definitely describe a fastening configuration between the dented portion 31e and the shielding plate 35, the shielding plate 35 includes a circular bottom plate 35a and a cylindrical projected pin 35b extended vertically upward from a surface of the bottom plate 35a and the projected pin 35b is to be inserted into a free end portion of the coupling-fastening portion 31c simultaneously with inserting a rim portion of the bottom plate 35a into a sidewall of the dented portion 31e.

Also, the flat part 31 is formed in the shape of a polygonal with 12 planes similar to that of the flat part 11 of the body frame 10. Hence, the inclined part 32 extended from the flat part 31 with the certain incline angle θ2 also has 12 planes. Meanwhile, a periphery of the dented portion 31e of the transmission plate 30, on which the connecting holes 31b are formed, becomes a first transmission surface 31d located on top of the first fastening surface 11d of the body frame 10.

Accordingly, when an LED lamp is attached to the first fastening surface 11d and turned on, light emitted from the LED lamp is diverged outside via the first transmission surface 31d.

In addition, the inclined part 32 is extended upward with the certain incline angle θ2 from the rim of the 12 planes of the flat part 31, thereby forming a surface thereof to have 12 planes. In other words, the inclined part 32 is extended toward the rim part 33 from an end portion of the flat part 31 in such a way that an internal diameter thereof is extended and each side has a trapezoidal shape as that of the flat part 11 of the body frame 10. The side becomes a second transmission surface 32d located on top of the second fastening surface 12d where the LED lamp is attached.

Hence, when an LED lamp is attached to the second fastening surface 12d and turned on, light emitted from the LED lamp is discharged outside via the second transmission surface 32d.

Meanwhile, planes formed on edges of the flat part 31 and the inclined part 32 of the transmission plate 30 may be 3, 4, 6, 8, and 10 as an example, according to the shape of the body frame 10.

Also, the transmission plate 30 is formed to be symmetrical to the axis of rotation based on the central reference line R, similar to the body frame 10.

Figure 9:
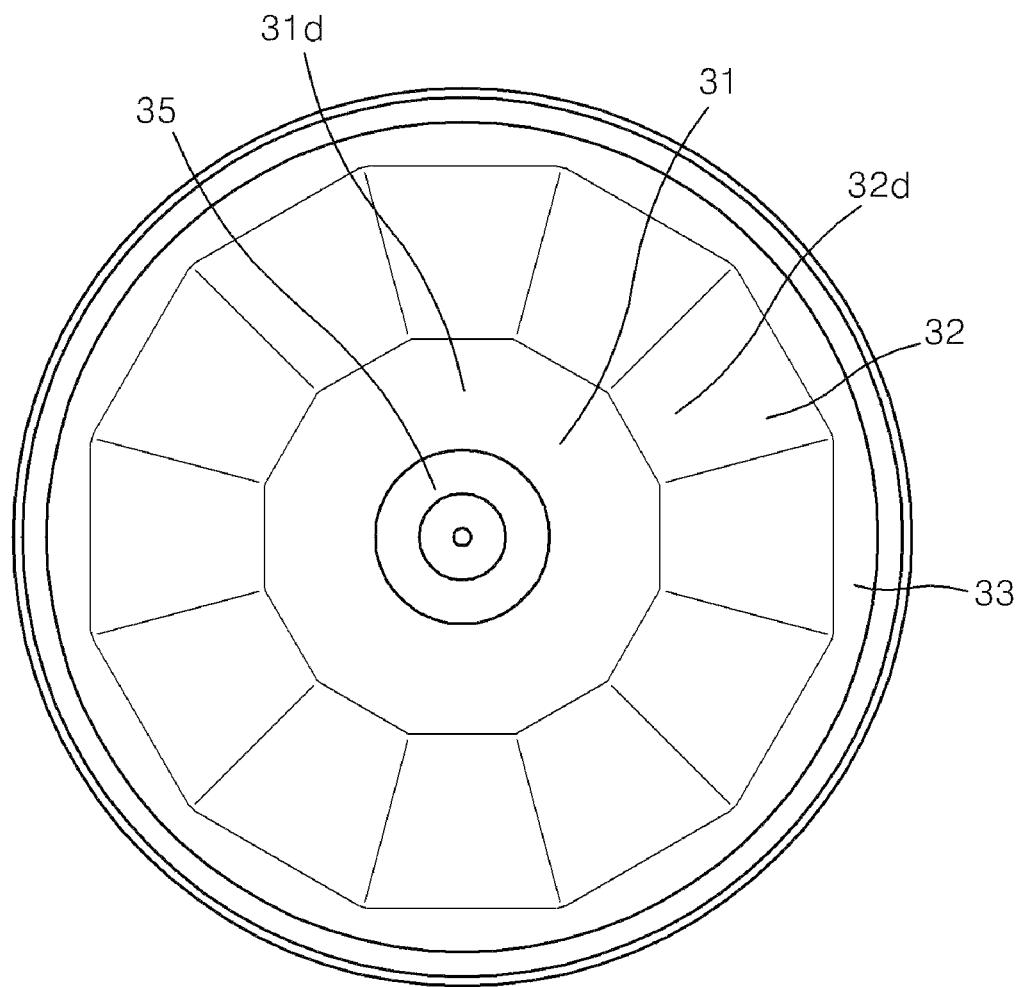
FIG. 9 is a top view illustrating the transmission plate.

FIG. 9 is a top view illustrating the transmission plate 30, in which there are shown the flat part 31 having the edges with 12 planes, the inclined part 32 formed of 12 trapezoidal planes, and the rim part 33 formed in a ring shape extended from another end portion of the inclined part 32, the central opening portion 31a of the flat part being closed by the shielding plate 35.

Figure 10:
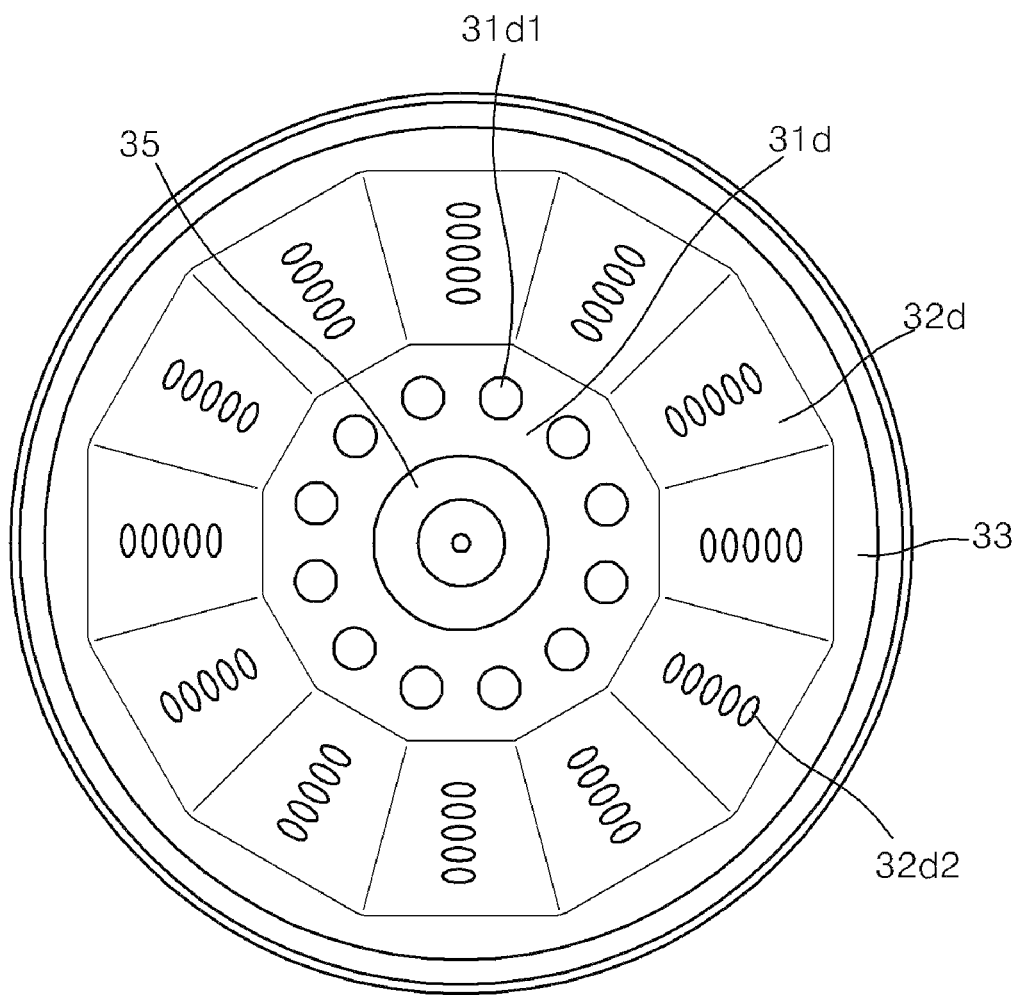
FIG. 10 is a top view illustrating a transmission plate including a plurality of lenses according to an embodiment of the present invention.

FIG. 10 is a top view illustrating the transmission plate 30 including lenses, in which there are shown the flat part 31 having the edges with 12 planes, the inclined part 32 formed of 12 planes, and the rim part 33, the central opening portion 31a being closed by the shielding plate 35. In addition, a plurality of first lenses 31d1 are circularly projected from the ring-shaped first transmission surface 31d of the flat part 31 around one of the central opening portion 31a and the shielding plate 35 and a plurality of second lenses 32d2 are linearly provided along a longitudinal direction of the inclined part 32 on the second transmission surface 32d, the direction toward the rim part 33 from the flat part 31.

On the other hand, the plurality of first and second lenses 31d1 and 32d2 may be selectively provided on the transmission plate 30. That is, both the first and second lenses 31d1 and 32d2 may be provided and either of the first and second lenses 31d1 and 32d2 may be provided on the transmission plate 30. In FIG. 6, there is shown a cross-section of the transmission plate 30 including the second lenses 32d2 only on the second transmission surface 32d of the inclined part 32.

Also, in FIG. 10, the plurality of first lenses 31d1 are circularly disposed and the plurality of second lenses 32d2 are linearly disposed but a way of arranging them may be diversely selected.

In addition, as shown in (a) of FIG. 11, the first and second lenses 31d1 and 32d2 include incident planes that are inner surfaces to which light is incident from an LED lamp 24 of the light emitting part 20 described later, the incident planes being flat, and diverging planes that are outer surfaces formed in a convex shape with a certain curvature and a certain diameter r1.

Meanwhile, according to an experiment performed by the present inventor, a light emitting angle θ3 of the LED lamp 24 was determined to be 115° and distances d1' and d2' were determined to be 7 mm, and the diameter r1 was determined to be 13 mm in such a way that illumination of the emitted light measured at the certain distances d1' and d2' was maximum.

Accordingly, when the transmission plate 30 is attached to the body frame 10, distances d1 and d2 between the body frame 10 and the transmission plate 30 may be determined considering the distances d1' and d2' of 7 mm and the thickness of a board.

Figure 11:
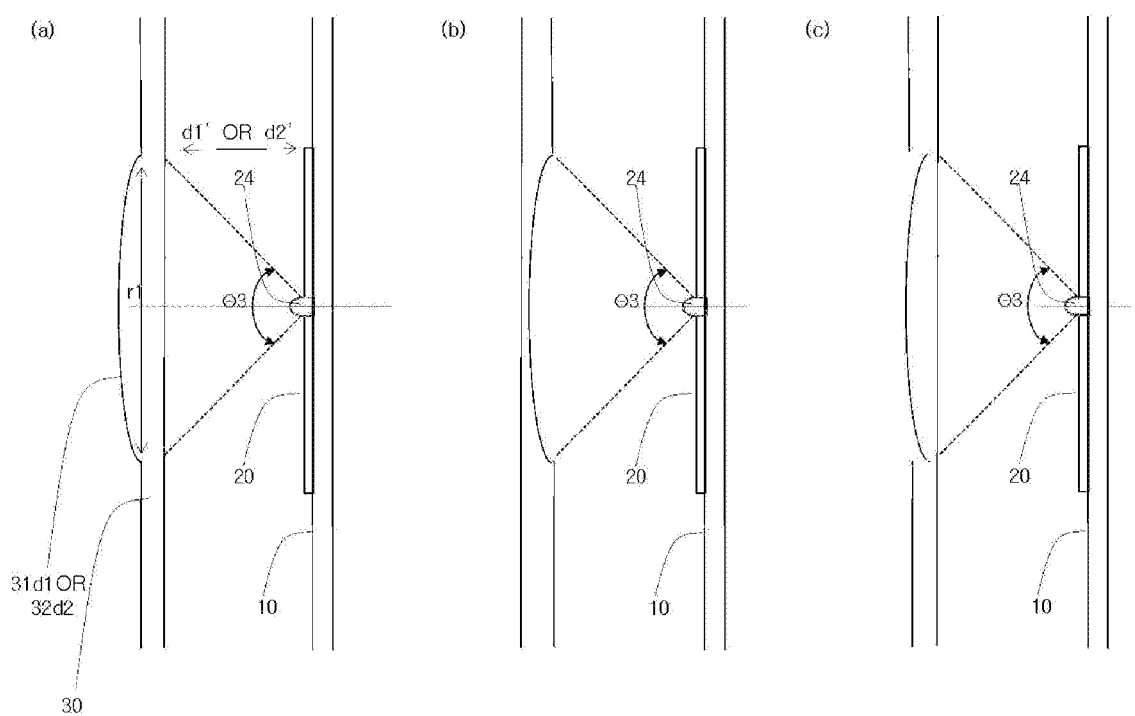
FIG. 11 is a schematic side view illustrating a configuration of the lenses included in the transmission plate.

In addition, as shown in (b) of FIG. 11, the incident planes of the lenses 31d1 and 32d2, which are inner surfaces, may be dented as a concave shape with a certain curvature and a certain diameter and the diverging planes thereof, which are outer surfaces, may be formed to be flat.

In addition, as shown in (c) of FIG. 11, the incident planes of the lenses 31d1 and 32d2, which are inner surfaces, may be formed to be flat and the diverging planes thereof, which are outer surfaces, may be projected as a convex shape with a certain curvature and a certain diameter and simultaneously with being dented with a certain depth from a peripheral flat portion of the outer surfaces.

On the other hand, according to employing the configurations shown in (a) to (c) of FIG. 11, light emitted from the LED lamp 24 may pass through the lenses 31d1 and 32d2 and be discharged outside decreasing interference from the periphery of the transmission plate 30.

Figure 12:
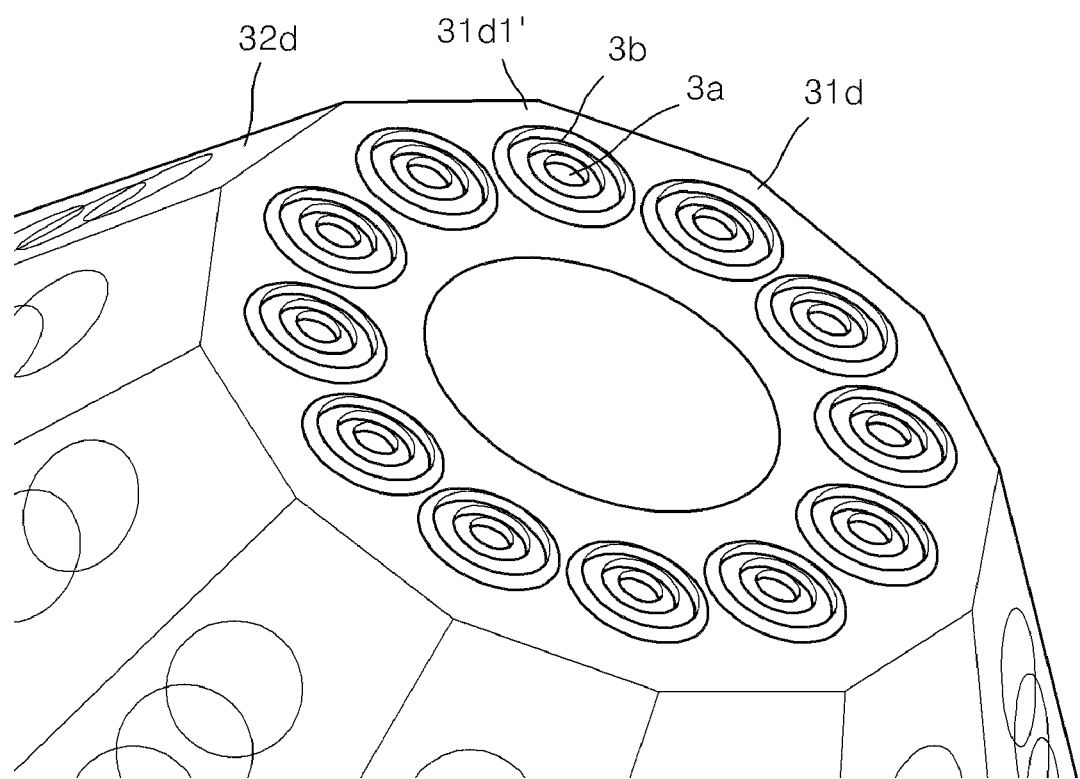
FIG. 12 is a schematic perspective view illustrating a transmission plate according to another embodiment of the present invention.

FIG. 12 illustrates lenses 31d1' attached to the flat part 31 of the transmission plate 30, that is, to the first transmission surface 31d in a ring shape according to another embodiment of the present invention. Meanwhile, in case of transmission plate 30 shown in FIG. 12, though there is no provided lens on the second transmission surface 32d, lenses 32d2' may be provided linearly on the second transmission surface 32d as shown in FIG. 9 if necessary.

Figure 13:
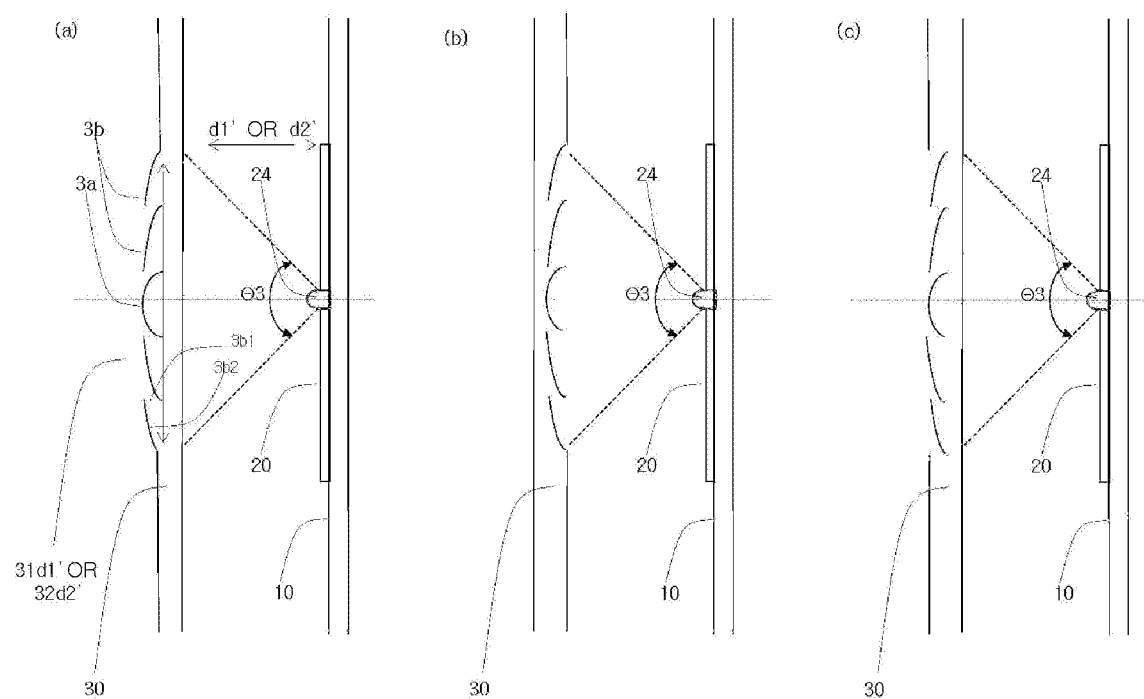
FIG. 13 is a schematic side view illustrating a configuration of lenses provided at the transmission plate.

Also, the lenses shown in FIG. 12, cross-sections thereof being definitely shown in FIG. 13, include curvedly projected portions 3a, a plurality of projected portions 3b in ring shapes surrounding the curvedly projected portions 3a as concentric circles.

On the other hand, as shown in (a) of FIG. 13, the lenses 31d1' and 32d2' provided either of the first transmission surface 31d and the second transmission surface 32d include outer surfaces and inner surfaces where the curvedly projected portions 3a in semicircular shapes in the center and the plurality of projected portions 3b in ring shapes surrounding the curvedly projected portions 3a as concentric circles are formed, respectively.

In this case, the curvedly projected portion 3a in a semicircular shape is curved with a certain radius curvature to form a side shape of the outer surface in an approximate semicircular shape and the projected portions 3b in ring shapes includes vertical surfaces 3b1 extended straightly upward from the rim of the curvedly projected portion 3a and curved surfaces 3b2 curved with a certain curvature toward the outer surface from the vertical surfaces 3b1 in such a way that a cross-section of the outer surface has the shape of an approximate ¼ circular arc. Meanwhile, though the vertical surface 3b1 is shown as vertical to the surface of the transmission plate 30 in the drawing, the vertical surface 3b1 may be formed with a certain incline angle.

Additionally, as shown in (b) of FIG. 13, the lenses 31d1' and 32d2' may include outer surfaces that are flat portions and inner surfaces where there are formed the curvedly projected portions 3a in semicircular shapes in the center, the plurality of projected portions 3b in ring shapes surrounding the curvedly projected portions 3a as concentric circles.

Also, as shown in (c) of FIG. 13, the lenses 31d1' and 32d2' may include incident surfaces to which light is incident from the LED lamp 24 of the light emitting part 20, which are inner surfaces formed to be flat, and diverging surfaces that are outer surfaces where there are formed the curvedly projected portions 3a in semicircular shapes in the center and the plurality of projected portions 3b in ring shapes surrounding as concentric circles simultaneously with being dented with a certain depth from peripheral portions thereof on the outer surfaces.

Meanwhile, employing the configurations of (a) to (c) of FIG. 13, the light emitted from the LED lamp 24 may pass through lenses and be discharged outwards while decreasing interference with the periphery of the transmission plate 30.

Figure 14:
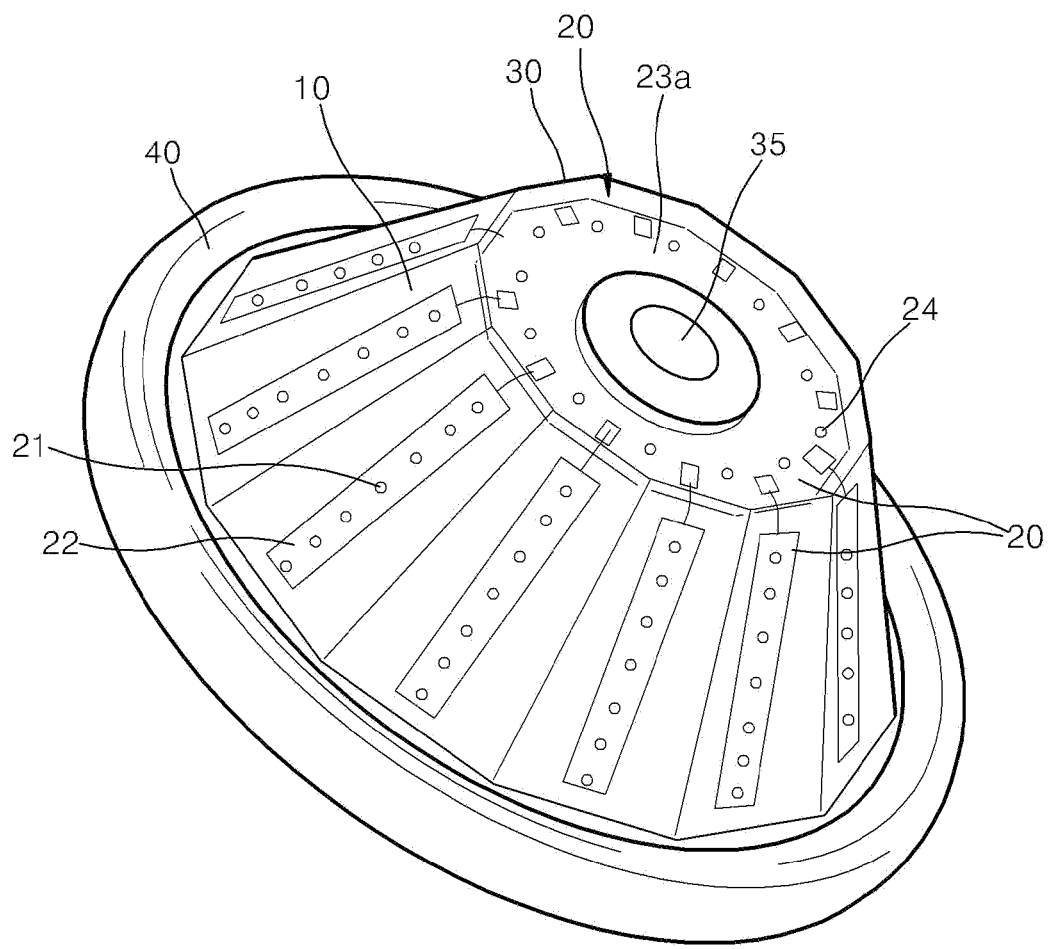
FIG. 14 is a perspective view illustrating a light emitting part installed according to an embodiment of the present invention.

FIG. 14 is a top view illustrating the transmission plate 30, in which there are shown the flat part 31 having edges with 12 planes, the inclined part 32 including 12 planes formed in trapezoidal shapes, and the rim part 33 while the central opening portion 31a of the flat part 31 is being closed by the shielding plate 35.

[Configuration of Coupling Between the Body Frame and the Transmission Plate]

A coupling between the body frame 10 and the transmission plate 30 is now be described with reference to FIG. 6. The first coupling between the body frame 10 and the transmission plate 30 is performed using a pressurizing part 41 pressurizing the rim part 33 of the transmission plate 30 toward the rim part 13 of the body frame 10 and a fastening bracket 40 where insertion holes connected to the coupling holes 13f are formed.

Meanwhile, such fastening bracket 40 is formed in a ring shape depending on the shapes of the rim parts 13 and 33.

In detail, as shown in FIG. 6, while the coupling-fastening portion 31c of the transmission plate 30 is being inserted into the periphery portion 11c of the body frame 10, the pressurizing part 41 of the fastening bracket 40 is located on the rim part 33 of the transmission plate 30 and screws are inserted into the coupling holes 13f and the insertion holes 42, thereby compressing-coupling the rim part 33 of the transmission plate 30 with the rim part 13 of the body frame 10.

On the other hand, into the rim part 33 of the transmission plate 30, sealing element 36 formed of, as an example, rubber is inserted to prevent flowing of moisture into an installation space Sd for the light emitting part 20, which will be described later, formed by the inner surface of the transmission plate 30 and the outer surfaces of the outer surface of the body frame 10.

[Configuration of the Light Emitting Part]

Figure 15:
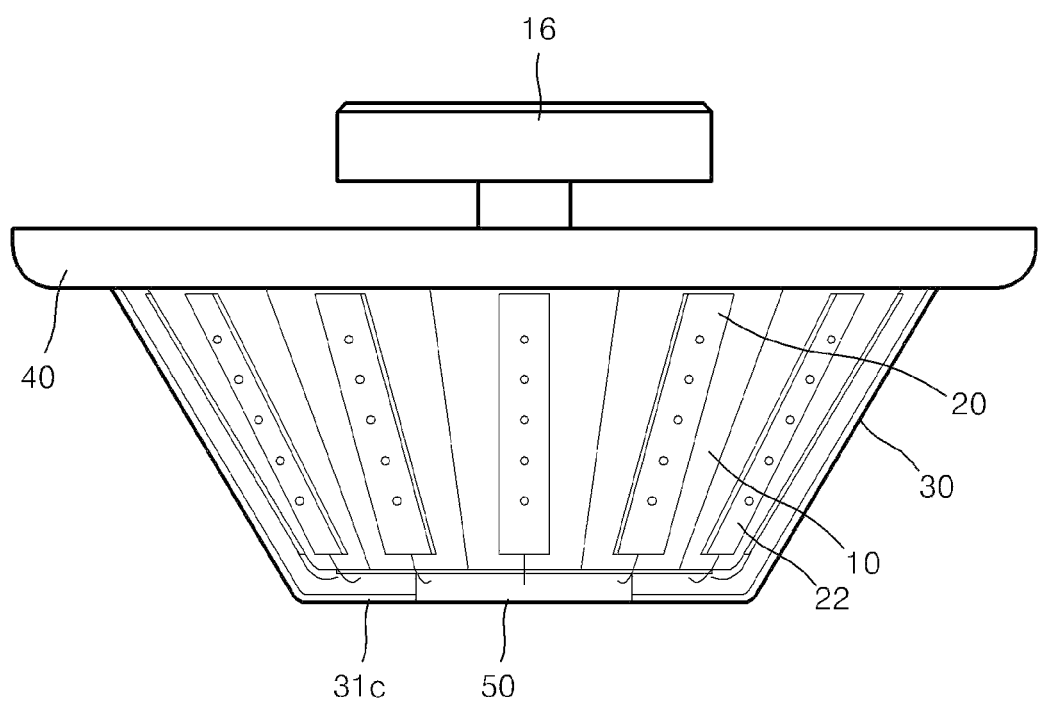
FIG. 15 is a side view illustrating the light emitting part.

FIG. 14 is a perspective view illustrating the LED streetlamp device including the light emitting part 20 installed therein, and FIG. 15 is a side view illustrating the same. In FIGS. 14 and 15, the light emitting part 20 is attached to the first fastening surface 11d and the second fastening surface 12d of the body frame 10 and the transmission plate 30 is attached to the body frame 10 where the light emitting part 20 is installed by the fastening bracket 40 and covers the light emitting part 20.

The light emitting part 20 includes a first light emitting portion 21 installed on the first fastening surface 11d and a second light emitting portion 22 installed on the second fastening surface 12d.

In this case, the first and second light emitting portions 21 and 22 may include boards 23a and 23b that may be printed circuit boards (PCBs) for installing a plurality of the LED lamps 24 thereon and the plurality of the LED lamps 24 installed on the substrates 23a. On the other hand, since the first light emitting portion 21 is installed on the first fastening surface 11d in a ring shape, the board 23a thereof has a ring shape. Also, since the second light emitting portion 22 is installed on the second fastening surface 12d in a tetragonal shape, the board 23b has a tetragonal shape.

That is, the first light emitting portion 21 includes the board 23a in a ring shape and the plurality of LED lamps installed circularly one the board 23a and the second light emitting portion 22 includes the board 23b in a tetragonal shape and the plurality of LED lamps 24 linearly formed along a longitudinal direction of the inclined part 12 on the board 23b.

Meanwhile, a lens cap 25 may be attached to the LED lamp 24 to diffuse the light emitted therefrom. In the drawing, the lens cap 25 is manufactured in a hollow hexagonal shape and attached to the lens interposing a hollow portion therebetween, and a lens with a certain curvature is formed on top plane facing the LED lamp 24.

On the other hand, though there is shown the lens cap 25 partly attached to the LED lamp 24 in FIG. 14 and there is shown a state without the lens cap 25 in FIG. 15, it may be determined depending on whether to attach the lenses 31d1, 32d2, 31d1', and 32d2' to the transmission plate 30 to attach the lens cap 25 to the LED lamp 24.

On the other hand, a reference numeral 26 indicates connecting wires connecting the boards 23a and 23b of the first light emitting portion 21 and the second light emitting portion 22 and a reference numeral 27 indicates a connector. Via such wires, power is supplied to the LED lamp 24 of the second light emitting portion 22. On the other hand, wires (not shown) may be connected to the lamppost via the fastening portion 11a of the body frame 10 from the rear of the first light emitting portion 21 and may connect power (not shown) to the board 23a of the first light emitting portion 21.

Figure 16:
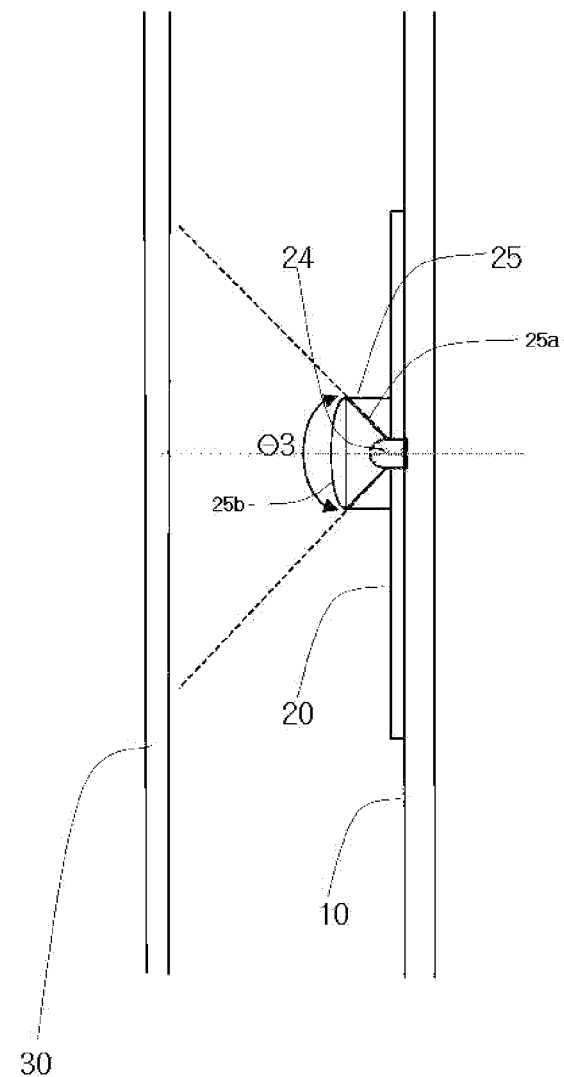
FIG. 16 is a schematic side view illustrating the LED lamp and the light emitting part formed of a lens cap on the LED lamp, which are installed on the body frame, in which there is no provided lens on the transmission plate.

Meanwhile, FIG. 16 illustrates a state in which the LED lamp 24 and the light emitting part 20 formed by installing the lens cap 25 on the LED lamp 24 are installed on the body frame 10 and there is no provided lens on the transmission plate 30.

In this case, the lens cap 25 includes an inclined reflecting plate 25a designed considering the light emitting angle θ3 and a lens 25b located on top of the LED lamp 24. Since such lens cap 25 is attached to the light emitting part 20, it is not necessary to provide a lens on the transmission plate 30.

On the other hand, though the lens 25b on the lens cap 25 is formed according the shape shown in (a) of FIG. 11, it is possible to employ anyone of the shapes shown in (a) to (c) of FIG. 11 and (a) to (c) of FIG. 13.

The invention claimed is:

1. A light emitting diode (LED) streetlamp device comprising:
    a body frame comprising a first flat part and a first inclined part formed being extended from a rim portion of the first flat part with a certain incline angle θ1;
    a light emitting part installed on the first flat part and the first inclined part, the light emitting part comprising a plurality of LED lamps;
    a lens cap attached to each of the plurality of LED lamps to diffuse the light emitted from the light emitting part;
    a transmission plate comprising a second flat part located being separated from the first flat part with a certain distance and a second inclined part extended from a rim portion of the second flat part with a certain incline angle θ2 separated from the first inclined part with a certain distance and covering the body frame; and a plurality of lenses are provided on the second flat part and second inclined part such that light emitted from the light emitting part is homogenized via the plurality of lenses, and wherein either of the second flat part and the second inclined part comprise outer surfaces where light is emitted from and inner surfaces where the light is incident, and wherein each of the plurality of lenses comprise a curvedly projected portion curved with a first curvature on the outer surface, a third flat portion on the inner surface and a plurality of projected portions in ring shapes surrounding the curvedly projected portion as concentric circles and around the third flat portion, and each of the plurality of projected portions include a vertical surface extended straightly upward from a rim of the curvedly projected portion and a curved surface curved with a second curvature toward the outer surface from the vertical surface such that light emitted from the light emitting part is discharged outside decreasing interference from a periphery of the transmission plate.

2. The LED streetlamp device of claim 1, wherein the plurality of lenses are located on top of corresponding ones of the plurality of LED lamps, respectively.

3. The LED streetlamp device according to claim 1, wherein the plurality of lenses provided on the second flat part are circularly arranged and the plurality of lenses provided on the second inclined part are arranged along a longitudinal direction of the second inclined part.

4. The LED streetlamp device according to claim 1,
wherein each of the plurality of lenses comprises a flat portion on the outer surface and a concavely dented portions with a first curvature on the inner surface.

5. The LED streetlamp device according to claim 1,
wherein the curvedly projected portions being dented from peripheries thereof on the outer surfaces.

6. The LED streetlamp device according to claim 1,
wherein each of the plurality of lenses comprises a flat portion on the outer surface, a concavely dented portions with a first curvature on the inner surface, and a plurality of dented portions in ring shapes surrounding the concavely dented portion as concentric circles.

* * * * *